(12) United States Patent  
Hauvespre et al.

(10) Patent No.: US 10,738,824 B2  
(45) Date of Patent: Aug. 11, 2020

(54) ROTATING BEARING ASSEMBLY, IN PARTICULAR FOR A CAMSHAFT

(71) Applicant: Aktiebolaget SKF, Gothenburg (SE)

(72) Inventors: Benoit Hauvespre, Saint Etienne de Chigny (FR); Mickael Chollet, Joué-lès-Tours (FR); Samuel Viault, Saint-Antoine-du-Rocher (FR)

(73) Assignee: Aktiebolaget SKF, Gothenburg (SE)

( * ) Notice: Subject to any disclaimer, the term of this patent is extended or adjusted under 35 U.S.C. 154(b) by 22 days.

(21) Appl. No.: 15/983,231

(22) Filed: May 18, 2018

(65) Prior Publication Data

US 2018/0355912 A1 Dec. 13, 2018

(30) Foreign Application Priority Data

Jun. 8, 2017 (DE) .................. 10 2017 209 671

(51) Int. Cl.
| | |
|---|---|
| F16C 19/06 | (2006.01) |
| F16C 33/78 | (2006.01) |
| F16C 33/66 | (2006.01) |
| F16C 33/41 | (2006.01) |

(52) U.S. Cl.  
CPC ............ *F16C 19/06* (2013.01); *F16C 33/414* (2013.01); *F16C 33/782* (2013.01); *F16C 33/783* (2013.01); *F16C 33/7823* (2013.01); *F16C 2360/18* (2013.01)

(58) Field of Classification Search  
CPC .. F16C 19/06; F16C 33/7823; F16C 2360/18; F16C 33/414; F16C 33/6637; F16C 33/6666; F01L 2001/0476

USPC .................. 384/477, 484, 523, 531, 534  
See application file for complete search history.

(56) References Cited

U.S. PATENT DOCUMENTS

| | | | | |
|---|---|---|---|---|
| 2,038,010 | A * | 4/1936 | Smith ................. | F16C 33/414 384/481 |
| 3,361,497 | A * | 1/1968 | Stengel ................ | F16C 33/66 277/412 |
| 4,655,617 | A * | 4/1987 | Yasui ................. | F16C 33/7846 384/465 |
| 6,357,336 | B1* | 3/2002 | Wittmann ............. | F16C 19/54 74/60 |
| 8,967,104 | B2* | 3/2015 | Dietz ................. | F01L 1/047 123/90.15 |
| 9,011,016 | B2* | 4/2015 | Adane ................ | F16C 33/3887 384/531 |
| 2005/0058377 | A1* | 3/2005 | Meeker ............... | F16C 19/186 384/470 |

(Continued)

*Primary Examiner* — Marcus Charles  
(74) *Attorney, Agent, or Firm* — Garcia-Zamor Intellectual Property Law; Ruy Garcia-Zamor; Bryan Peckjian

(57) ABSTRACT

A rotating bearing assembly having a stationary housing, a rotating shaft, and a rolling bearing radially arranged between the stationary housing and a shaft end of the rotating shaft. The rolling bearing provides a seal that includes a stiffening insert and a sealing gasket disposed between the inner ring and the outer ring on an axial side of rolling bearing. The rolling bearing is open on the opposite axial direction to the shaft end. A cage includes an annular heel oriented towards the axial side of the shaft end, two circumferentially adjacent pockets being separated by a projected portion that axially extends from the heel towards the open axial side of rolling bearing.

6 Claims, 1 Drawing Sheet

(56) References Cited

U.S. PATENT DOCUMENTS

| | | | |
|---|---|---|---|
| 2011/0299805 A1* | 12/2011 | Damato | F16C 19/163 384/531 |
| 2012/0174882 A1* | 7/2012 | Hamada | F01L 1/053 123/90.1 |
| 2015/0247533 A1* | 9/2015 | Fickert-Guenther | F16C 33/7823 384/480 |
| 2015/0330454 A1* | 11/2015 | Isoda | F16C 33/7856 384/485 |

* cited by examiner

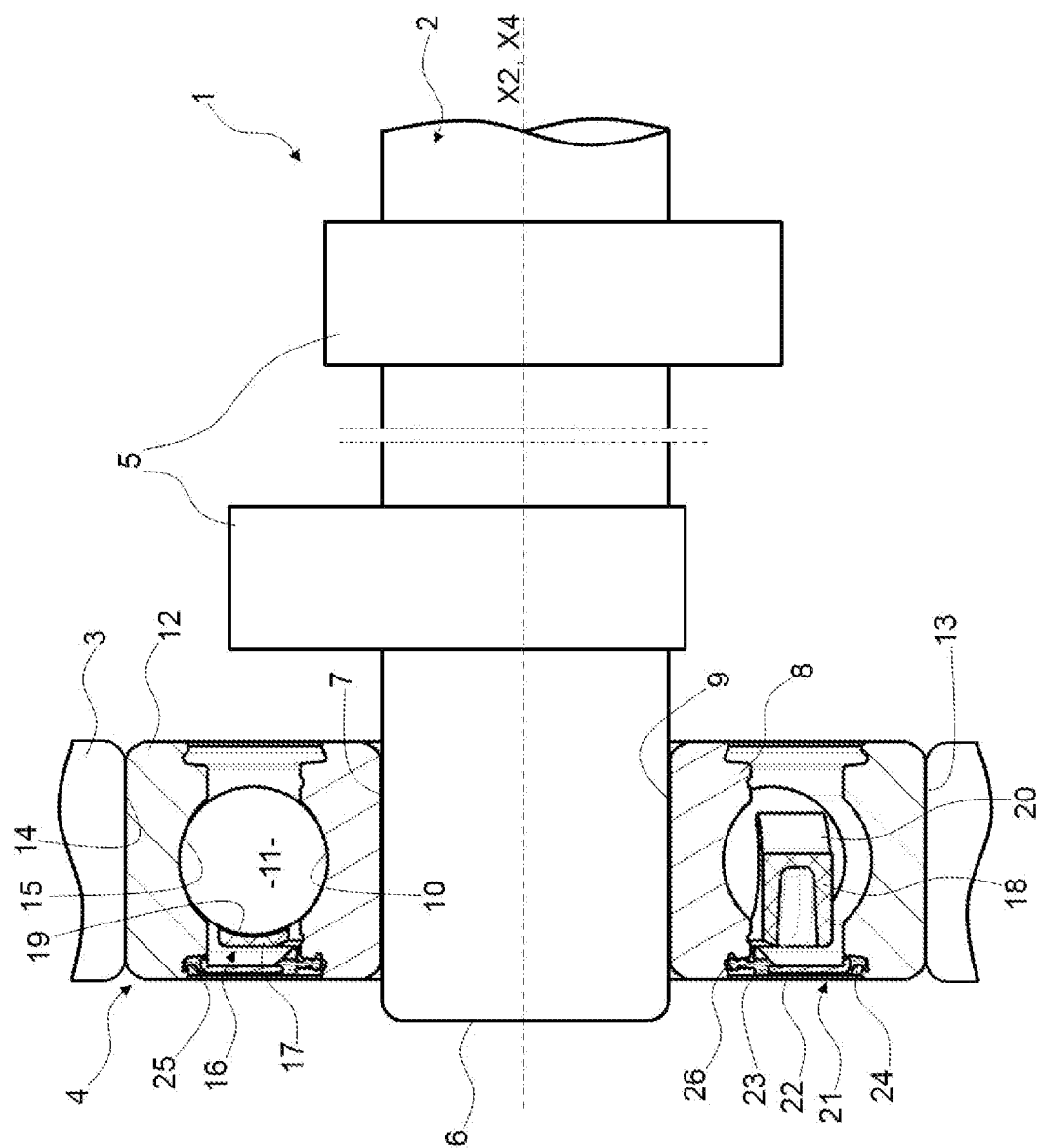

ROTATING BEARING ASSEMBLY, IN PARTICULAR FOR A CAMSHAFT

CROSS-REFERENCE

This application claims priority to German patent application no. 102017209671.3 filed on Jun. 8, 2017, the contents of which are fully incorporated herein by reference.

TECHNOLOGICAL FIELD

The present invention relates to a rotating bearing assembly including a stationary housing, a rotating shaft and a radial rolling bearing. More particularly, the invention relates to a valve control device of an engine of the type comprising a camshaft, and a radial rolling bearing able to support in rotation the camshaft within an engine block.

BACKGROUND

An internal combustion engine is provided with at least one cylinder, and a cylinder end having a face closing the cylinder and defining a combustion chamber. A motor may comprise for example three, four, six or eight cylinders which are arranged in line, in V, or flat at 180°. Pistons are disposed in each of the cylinders in which they can move in translation back and forth. Pistons are each connected to a rod, itself connected to a crankshaft. The assembly of rods crankshafts permits to convert the alternate movement of pistons into a rotating movement.

Internal combustion engine further includes valves whose opening and closing are controlled directly or indirectly by a push upon rotation of a camshaft, so as to permit the admission or discharge of gas within the combustion chamber. Camshaft is driven by the crankshaft through a toothed belt, a chain, or a cascade of gears. Camshaft is supported in rotation in the engine block by rolling bearings arranged at ends of the camshaft.

In the particular application with a dry belt, camshaft has to be sealed on ends to prevent leaks of lubricant or oil towards the dry belt. Generally a sealing ring is fit within a housing of engine block, the sealing ring comprising a sealing lip in sliding contact with the outer surface of the rotating camshaft.

However, such arrangement of rotating bearing assembly requires an additional part to ensure the sealing function, and an adapted housing design to integrate the additional part. It increases the number of assembly steps and the assembly time.

SUMMARY

The aim of the invention is to solve the above difficulties. It is proposed a rotating bearing assembly including a sealing function that is economic and of optimized assembly process.

To this end, the invention relates to a rotating bearing assembly comprising a stationary housing, a rotating shaft, and a rolling bearing radially arranged between the stationary housing and a shaft end of the rotating shaft. Rolling bearing comprises an inner ring mounted on an outer cylindrical surface of shaft end, an outer ring mounted in a cylindrical bore of stationary housing, a plurality of rolling elements radially arranged between inner ring and outer ring, and a cage comprising a plurality of pockets wherein the rolling elements are housed.

According to the invention, the rolling bearing further comprises sealing means mounted between the inner ring and the outer ring on an axial side of rolling bearing that is oriented towards the shaft end on which the rolling bearing is mounted, the rolling bearing being open on the opposite axial direction to the shaft end. Furthermore, the cage comprises an annular heel oriented towards the axial side of the shaft end, two circumferentially adjacent pockets being separated by a projected portion that axially extends from the heel towards the open axial side of rolling bearing.

Thanks to the invention, the rotating shaft is sealed at one end by the rolling bearing provided with sealing means. The rotating bearing assembly does not require any additional sealing means to be mounted between the stationary housing and the rotating shaft. The sealing function is directly integrated in the rolling bearing. The rolling bearing provides a first function to support in rotation the rotating shaft with respect to the stationary housing, and a second function to seal the shaft end of the rotating shaft. Lubricant or oil cannot axially pass through sealing means of rolling bearing between housing and shaft.

The rotating bearing assembly according to the invention is more economic since it does not require an adapted housing for an additional sealing means.

Another advantage of the present invention is that the rotating bearing assembly is more compact compared to an assembly provided with sealing means provided with a rolling bearing and sealing means that are axially adjacent. The assembly according to the invention does not need sealing outside the rolling bearing. The compact design permits to reduce the assembly weight. Alternatively, the compact design permits to axially include additional technical features, for example hybrid traction chains.

Another advantage is that the rolling bearing and the sealing means are assembled together as a pack that is deliverable by a bearing supplier. The number of assembly step of the sealed rolling bearing on a rotating shaft is reduced for the assembly manufacturer.

Another advantage of the present invention is that the sealing means are oriented on the axial side towards the end shaft. Moreover, cage heel is oriented on the same axial direction towards the end shaft. Then the cage heel does not axially block the entry of lubricant in the rolling chamber defined between the inner and outer rings wherein the rolling elements are housed and roll. Then rolling elements can be lubricated so as to guarantee an optimized service life of rolling bearing.

According to further aspects of the invention which are advantageous but not compulsory, such a radial bearing assembly may incorporate one or several of the following features:

The rolling elements are balls.
Sealing means comprise a sealing gasket.
Sealing means comprise a stiffening insert.
Sealing means comprise an anchorage portion fitted in an annular groove of outer ring.
Sealing means comprise at least one sealing lip in sliding contact with inner ring.
Stiffening insert is made of metal.
Sealing gasket is made of polymer material.
A projected portion that axially extend from cage heel comprises a claw so as to axially snap a rolling element within a pocket.

The invention further relates to an internal combustion engine comprising a dry belt and the rotating bearing assembly according to any of the previous embodiments, wherein the stationary housing is a stationary engine block, the rotating shaft is a rotating camshaft, the rolling bearing being mounted on a shaft end of the camshaft.

Advantageously, the end shaft is on an axial side provided with the dry belt, and the dry belt is axially outside the rolling bearing.

BRIEF DESCRIPTION OF THE DRAWINGS

The invention will now be explained in correspondence with the annexed FIGURE, as illustrative example, without restricting the object of the invention.

DETAILED DESCRIPTION

The FIG. 1 discloses a rotating bearing assembly 1, in particular for use in an internal combustion engine. Assembly 1 is dedicated to drive movement of valves (not shown).

Assembly 1 comprises a rotating shaft 2, here a rotating camshaft, a stationary housing 3, here a stationary engine block, and a rolling bearing 4 to support in rotation the rotating shaft 2 with respect to the stationary housing 3.

Rotating shaft 2 is of longitudinal axis X2 and comprises a plurality of cams 5, as is known per se. Only two cams are illustrated in the present embodiment, but the rotating shaft 2 may comprise different number of cams. Outer surfaces of cams 5 rotate eccentrically with respect to axis X1 and drive valves in radial movement. Valves are linearly guided in translation inside an engine cylinder head (not shown).

Rotating shaft 2 axially extend between two ends, one shaft end 6 being oriented on an axial side provided with a dry belt (not shown). The shaft end 6 comprises an outer cylindrical surface 7 provided with the rolling bearing 4.

Rolling bearing 4 is of longitudinal axis X4 that is common with the axis X2 of rotating shaft.

Rolling bearing 4 comprises an inner ring 8 with an inner cylindrical bore 9 mounted on outer cylindrical surface of shaft end 6. Advantageously, inner ring 8 is press fitted onto shaft end 6 but inner ring 8 can be securely fixed to the shaft end 6 by any other suitable fixing means. Inner ring 8 is fastened in rotation with rotating shaft 2. Inner ring 8 further comprises an outer surface provided with a concave portion 10 forming an inner raceway for a plurality of rolling elements 11.

Rolling bearing 4 comprises an outer ring 12 with an outer cylindrical surface 13 mounted in a cylindrical bore 14 of stationary housing 3. Advantageously, outer ring 12 is press fitted into housing 3 but inner ring 12 can be securely fixed to the housing 3 by any other suitable fixing means. Outer ring 12 is stationary. Outer ring 12 further comprises an inner bore provided with a concave portion 15 forming an outer raceway for a plurality of rolling elements 11.

Rolling elements 11, here balls, are radially arranged between raceways 10, 15 of inner and outer rings 8, 12, respectively.

According to an aspect of the invention, sealing means 21 are provided on one axial side of the rolling bearing 4 towards the shaft end 6. The rolling bearing 4 is open on the opposite axial side.

Sealing means 21 comprise a stiffening insert 22 and a sealing gasket 23.

Stiffening insert 22 is annular and extend radially. Sealing gasket 23 is fixed to the stiffening insert 22. Advantageously, stiffening insert 22 is made of metal, and sealing gasket is made of polymer material.

Sealing gasket 23 comprises an annular anchorage portion 24 on a first radial end. Anchorage portion 24 is fitted into an annular groove 25 provided in the inner bore of outer ring 12. Annular groove 25 is provided on one axial side of the outer raceway 15 for the rolling elements 11. According to the invention, groove 25 is on the axial side oriented towards the shaft end 6.

Sealing gasket further comprises an annular sealing lip 26 on a second radial end, opposite radially to the anchorage portion 24. Sealing lip 26 is in sliding contact with a portion of the outer surface of inner ring 8 on the axial side of inner raceway 10 oriented towards the shaft end 6. In the present embodiment, sealing lip 26 contacts an annular groove provided on the outer surface of inner ring 8. Alternatively, sealing lip 26 may contact an outer cylindrical surface of inner ring 8.

The annular radial space between the shaft end 6 of rotating shaft 2 and the inner bore 14 of stationary housing 3 is sealed by the rolling bearing 4. Inner ring 8 of rolling bearing 4 is fitted on stationary shaft 2 and outer ring 12 of rolling bearing 4 is fitted in housing 3, sealing means 21 closing the radial space between the rings 8, 12. Lubricant or oil passing on rotating shaft 2 on one axial side can pass through the rolling bearing 4. Any lubricant or oil leakage is prevented towards the shaft end 6.

Assembly 1 does not require additional sealing means between housing and shaft outside the rolling bearing. A dry belt can then be installed in internal combustion engine axially outside the sealed rolling bearing 4 without the risk of being in contact with lubricant or oil.

Furthermore, rolling elements 11 are circumferentially maintained by a cage 16. Cage 16 comprises an annular heel 17 designed to be arranged axially on one side of the rolling elements 11 and radially between the outer surface of inner ring and the inner bore of outer ring. Cage 16 further comprises a plurality of projected portions 18 that axially extend from the annular heel 17. Projected portions 18 are formed integral with heel 17 and between them delimit pockets 19 in which the rolling elements 11 are housed. Projected portions 18 form separation walls between two circumferentially adjacent pockets.

Advantageously, each of the projected portions 18 can be axially extended on its free end by a claw 20 so as to snap rolling elements 11 in a pocket 19. Alternatively, projected portions do not comprise such claws, or only a limited number of projected portions of cage comprise claws.

According to another aspect of the invention, the cage heel 17 is oriented on the axial side towards the shaft end 6, hence towards the sealing means 21. The projected portions 17 axially extend from the heel towards the opposite direction to shaft end 6, i.e. towards the open side of rolling bearing 4.

The sealing means 21 are oriented on one axial side towards the end shaft 6, while the other side of rolling bearing 4 is open. Lubricant or oil can then flow within the rolling bearing 4 between the inner ring 5 and outer ring 12. Moreover, cage heel 17 is oriented on the same axial direction towards the end shaft 6. Then the cage heel 17 does not axially block the entry of lubricant in the rolling bearing 4. Then rolling elements 11 can be lubricated so as to guarantee an optimized service life of rolling bearing 4.

Assembly 1 may comprise additional bearings to support in rotation the rotating shaft 2 with respect to the housing 2 in order to avoid any weakening. As non-illustrated example, a plain bearing may be provided on a central portion of the rotating shaft between two axially successive cams, and a second rolling bearing is provided on the opposite shaft end.

The invention has been illustrated with a ball bearing. Alternatively, rolling elements can be of roller type.

What is claimed is:

1. A rotating bearing assembly comprising:
a stationary housing,
a rotating shaft,
a rolling bearing radially arranged between the stationary housing and a shaft end of the rotating shaft, the rolling bearing comprising an inner ring mounted on an outer cylindrical surface of the shaft end, an outer ring mounted in a cylindrical bore of the stationary housing, a plurality of rolling elements radially arranged between the inner ring and the outer ring, and a cage comprising a plurality of pockets that houses the plurality of rolling elements,
the rolling bearing further comprises sealing means mounted between the inner ring and the outer ring on an axial side of rolling bearing that is oriented towards the shaft end on which the rolling bearing is mounted, the rolling bearing being open on the opposite axial direction to the shaft end, and
the cage comprises an annular heel oriented towards the axial side of the shaft end, two circumferentially adjacent pockets being separated by a projected portion that axially extends from the heel towards the open axial side of rolling bearing, wherein the projected portion that axially extends from the annular heel comprises a claw spaced from the annular heel and configured to axially snap one of the plurality of rolling elements within at least one of two circumferentially adjacent pockets such that the one rolling element is axially secured by a combination of the annular heel and the claw.

2. The rotating bearing assembly according to claim 1, wherein the plurality of rolling elements are balls.

3. The rotating bearing assembly according to claim 1, wherein the sealing means comprises an anchorage portion fitted in an annular groove of outer ring.

4. The rotating bearing assembly according to claim 1, wherein the sealing means comprises at least one sealing lip in sliding contact with inner ring.

5. The rotating bearing assembly according to claim 1, wherein one of the two circumferentially adjacent pockets does not have a claw positioned so as to engage a rolling element located therein.

6. A rotating bearing assembly comprising:
a stationary housing,
a rotating shaft,
a rolling bearing radially arranged between the stationary housing and a shaft end of the rotating shaft, the rolling bearing comprising an inner ring mounted on an outer cylindrical surface of the shaft end, an outer ring mounted in a cylindrical bore of the stationary housing, a plurality of rolling elements radially arranged between the inner ring and the outer ring, and a cage comprising a plurality of pockets that houses the plurality of rolling elements,
the rolling bearing further comprises sealing means mounted between the inner ring and the outer ring on an axial side of rolling bearing that is oriented towards the shaft end on which the rolling bearing is mounted, the rolling bearing being open on the opposite axial direction to the shaft end,
the sealing means comprises a stiffening insert that is annular and extends radially, and
the cage comprises an annular heel oriented towards the axial side of the shaft end, two circumferentially adjacent pockets being separated by a projected portion that axially extends from the heel towards the open axial side of rolling bearing, wherein the projected portion that axially extends from the annular heel comprises a claw spaced from the annular heel and configured to axially snap one of the plurality of rolling elements within at least one of two circumferentially adjacent pockets such that the one rolling element is axially secured by a combination of the annular heel and the claw.

* * * * *